Dec. 17, 1935.    K. W. GASCHE    2,024,988
STORAGE BATTERY
Filed Sept. 11, 1933
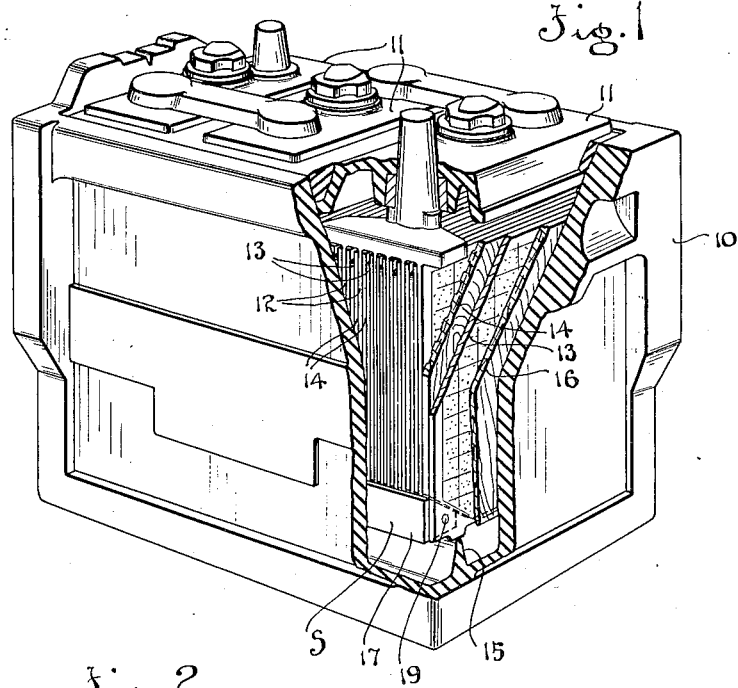
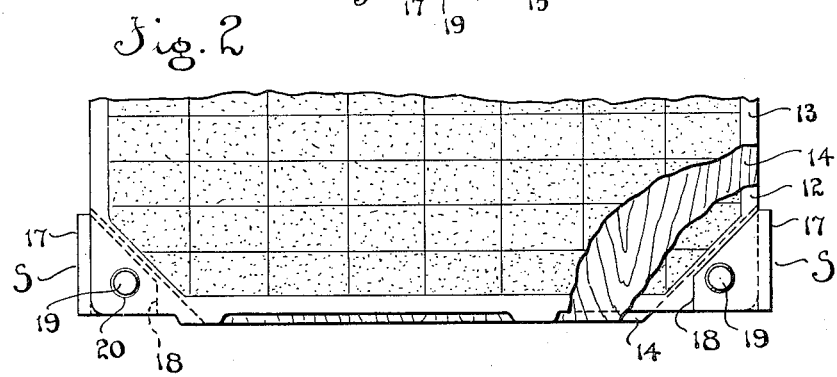
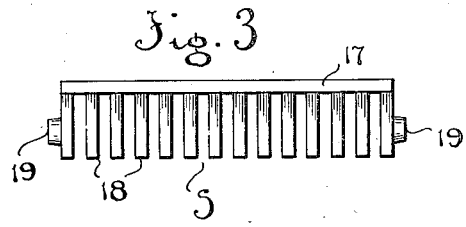
INVENTOR
Karl W. Gasche
BY
Ely Barrow
ATTORNEYS Patented Dec. 17, 1935

2,024,988

UNITED STATES PATENT OFFICE 2,024,988

STORAGE BATTERY

Karl W. Gasche, Stow, Ohio, assignor to Firestone Battery Company, Akron, Ohio, a corporation of Delaware Application September 11, 1933, Serial No. 688,929

2 Claims. (Cl. 136—143)

This invention relates to storage batteries, and more especially it relates to storage batteries employing only wood separators between the positive and negative plates thereof.

In storage batteries of the character mentioned, after excessive or prolonged use, the plates frequently warp or buckle, and the wood separators become so charred and disintegrated that they no longer serve as positive insulating means for the plates, with the result that the battery rapidly becomes useless.

The chief object of this invention is to provide supplemental means for holding the battery plates or electrodes in spaced relation after the wood separators are no longer capable of performing that function; and to provide such supplemental spacing means as will not be deleteriously affected by the electrolyte of the battery. Other objects will be manifest.

Of the accompanying drawing:

Figure 1 is a perspective view of a storage battery embodying the invention in its preferred form, parts thereof being broken away and in section;

Figure 2 is a fragmentary elevation of a group of battery plates and wood separators, and the improved supplemental separator means operatively associated therewith; and Figure 3 is a plan view of one of the supplemental separator devices.

Referring to the drawing, 10 is a battery box or case of the usual type, 11, 11 are covers on the respective cells thereof, 12, 12 are positive electrodes, 13, 13 are negative electrodes, and 14, 14 are porous separators of wood positioned between the adjacent positive and negative electrodes. The bottom of box 10 is formed with a plurality of upwardly projecting ribs, such as the rib 15, Figure 1, upon which the electrodes 12, 13 and separators 14 rest. At 16 is shown a tapered wood shim that is wedged between one end of the box 10 and the adjacent electrode of the battery for compacting the electrodes and separators so that there is no space for relative movement between them.

As is most clearly shown in Figure 2, the separators 14 are obliquely cut away at their bottom corners to permit the mounting thereat of a pair of supplemental electrode-separator structures generally designated S. Said structures are composed of molded hard rubber or other molded dielectric material of non-porous acid-resisting nature, and each of them comprises a backing plate 17 and a plurality of integral, spaced apart separator ribs of webs 18, 18 that extend laterally from one side of said backing plate. The separator structure S is mounted in operative position with its webs 18 positioned between respective positive and negative electrodes 12, 13, the backing plate 17 being disposed along the lateral edges of said electrodes. The webs 18 preferably have an oblique margin as shown, which margins are disposed adjacent the oblique margins at the lower corners of the wood separators 14 so that there is little space between the latter and the supplemental separator structures. The separators S are retained in proper position by lugs 19, 19 that are formed on the respective end-webs of the structure and project laterally therefrom, said lugs being mounted in respective apertures 20 formed in the outside electrode plates 13.

The supplemental separators are of simple construction, are easily mounted, and achieve the several advantages set out in the foregoing statement of objects.

Modification may be resorted to without departing from the spirit of the invention or the scope of the appended claims.

What is claimed is:

1. A storage battery comprising positive and negative electrodes, a unitary backing strip and a plurality of electrode separators projecting laterally therefrom between said positive and negative electrodes, said backing and separators being integrally molded of dielectric material, the separators at each end of the structure being formed with respective outwardly directed lugs by which the structure is secured to the two outermost electrodes of the battery.

2. A storage battery comprising a group of spaced positive and negative electrodes, each of the outer electrodes of said group being formed with an aperture adjacent a margin thereof, and a unitary dielectric electrode separator including a backing, a plurality of electrode spacers integral therewith projecting laterally from said backing and extending between said positive and negative electrodes, and a lug on each end of said separator extending in an outward direction into the respective apertures in the end plates.

KARL W. GASCHE.